(12) United States Patent
Edwin et al.

(10) Patent No.: US 8,271,012 B2
(45) Date of Patent: Sep. 18, 2012

(54) METHOD AND APPARATUS FOR MULTI-CASTING USEFUL INFORMATION IN A RADIO COMMUNICATION SYSTEM

(75) Inventors: Diana Clare Edwin, Southampton (GB); Christina Gessner, München (DE); Toby Kier Proctor, Southampton (GB); Jean-Michel Traynard, München (DE)

(73) Assignee: Siemens Aktiengesellschaft, Munich (DE)

( * ) Notice: Subject to any disclaimer, the term of this patent is extended or adjusted under 35 U.S.C. 154(b) by 1165 days.

(21) Appl. No.: 10/544,378

(22) PCT Filed: Jan. 26, 2004

(86) PCT No.: PCT/EP2004/000634
§ 371 (c)(1),
(2), (4) Date: Dec. 22, 2005

(87) PCT Pub. No.: WO2004/071118
PCT Pub. Date: Aug. 19, 2004

(65) Prior Publication Data
US 2006/0205418 A1    Sep. 14, 2006

(30) Foreign Application Priority Data
Feb. 3, 2003   (EP) .................................... 03250668

(51) Int. Cl.
*H04J 3/06*   (2006.01)
(52) U.S. Cl. ........ 455/515; 455/518; 370/312; 370/349; 370/390

(58) Field of Classification Search ............... 370/312, 370/349, 390; 455/515, 518
See application file for complete search history.

(56) References Cited

FOREIGN PATENT DOCUMENTS

| EP | 1 098 541 A1 | 5/2001 |
|---|---|---|
| EP | 1 206 072 A2 | 5/2002 |
| EP | 1206072 A2 * | 5/2002 |
| WO | WO 98/10604 | 3/1998 |
| WO | WO 9810604 A1 * | 3/1998 |
| WO | WO 99/16277 | 4/1999 |

OTHER PUBLICATIONS

3rd Generation Partnership Project; 3GPP TR 23.846 6.1.0 (Dec. 2002); Technical Specification Group Services and System Aspects; Multimedia Broadcast/Multicast Service (MBMS); Architecture and functional description (Release 6).*
IETF RFC 2710 (1999): "Multicast Listener Discovery (MLD) for IPv6".*

* cited by examiner

*Primary Examiner* — Kamran Afshar
*Assistant Examiner* — Dung Lam
(74) *Attorney, Agent, or Firm* — Staas & Halsey LLP

(57) ABSTRACT

In a radio communication system including a plurality of subscriber stations and at least one radio access device, useful information of a group of subscriber stations is transmitted by radio. A number of subscriber stations of the group is located in the radio coverage area of the at least one radio access device. The at least one radio access device notifies the subscriber stations of the number of subscriber stations of the group before the useful information is transmitted, using a radio resource. The notification contains information relating to at least one signal in the transmission of the useful information transmitted via another radio resource.

16 Claims, 2 Drawing Sheets

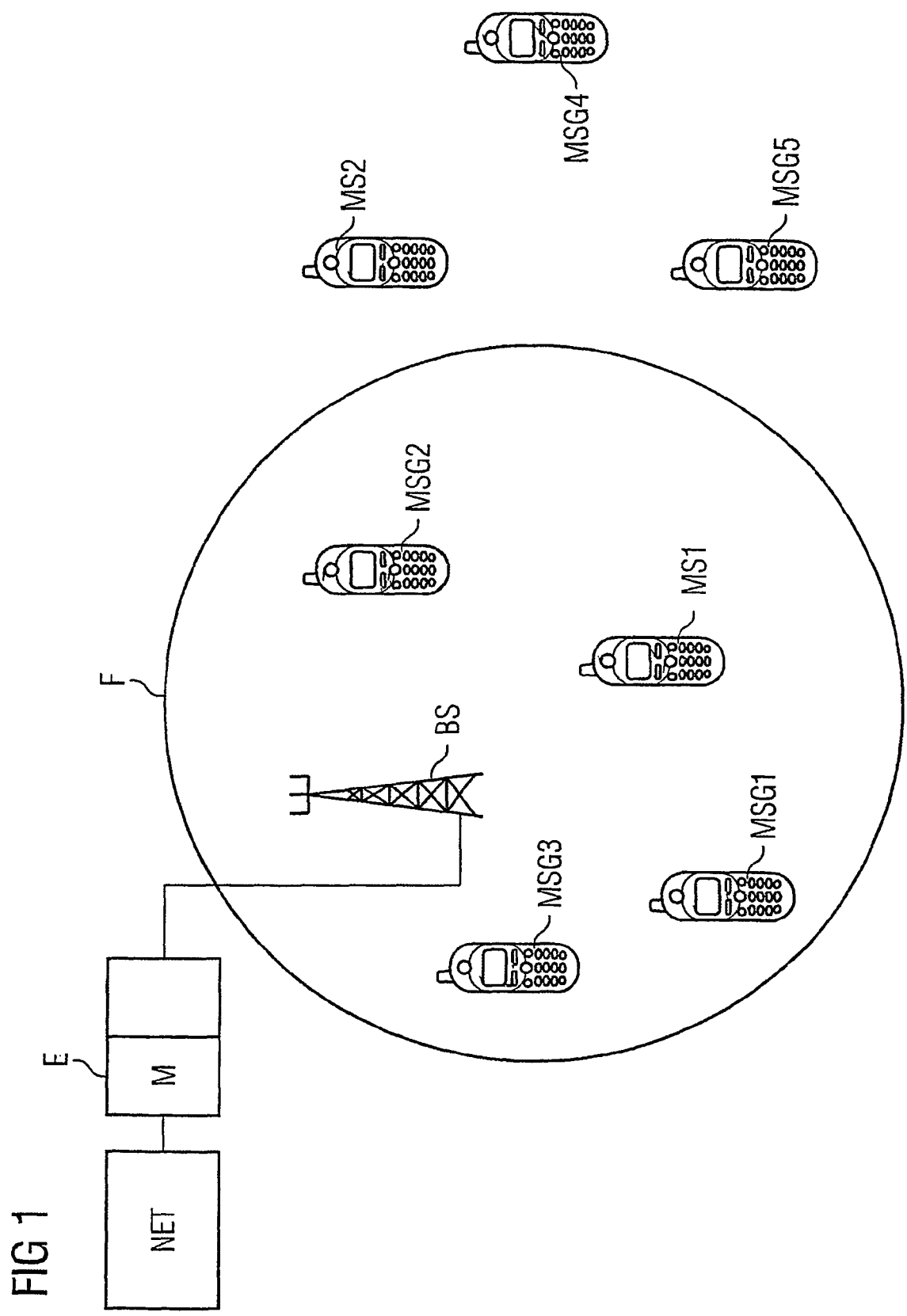

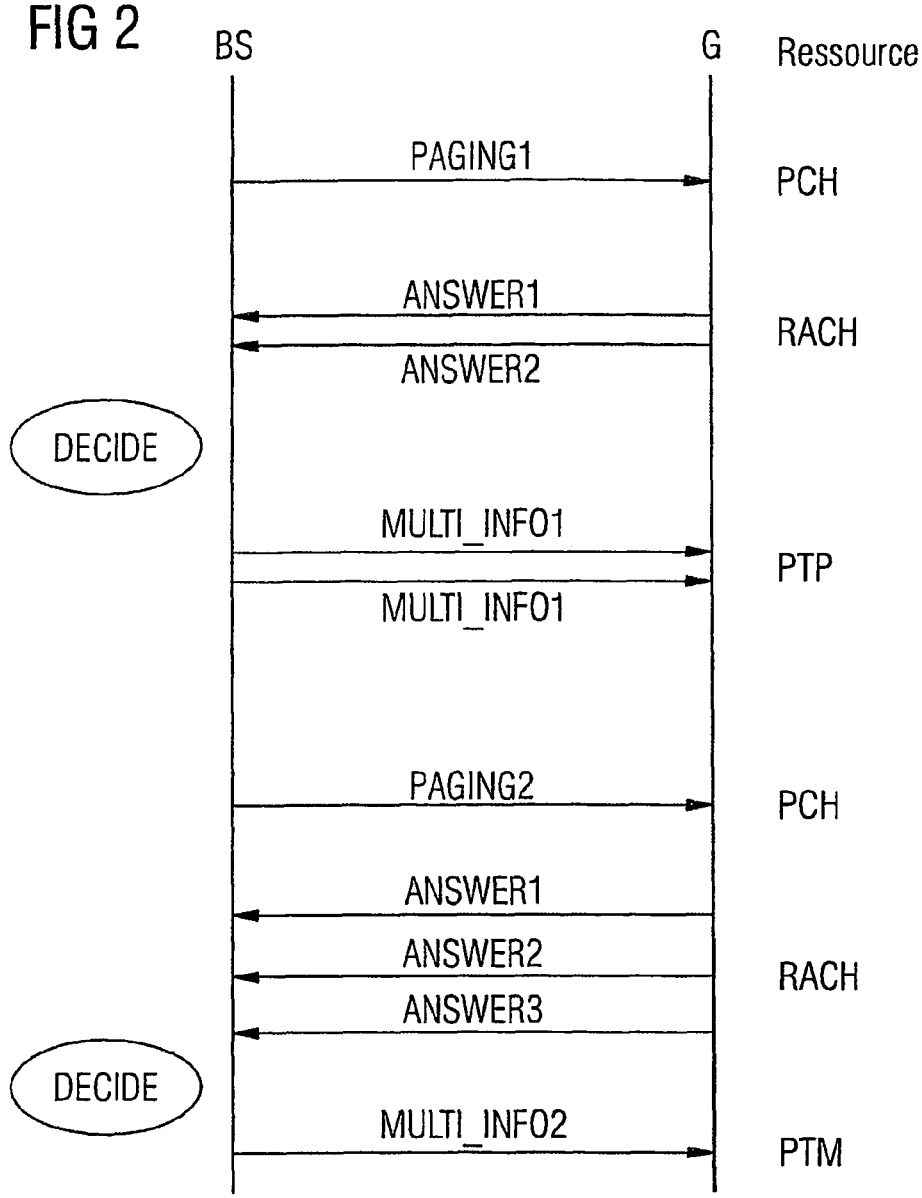
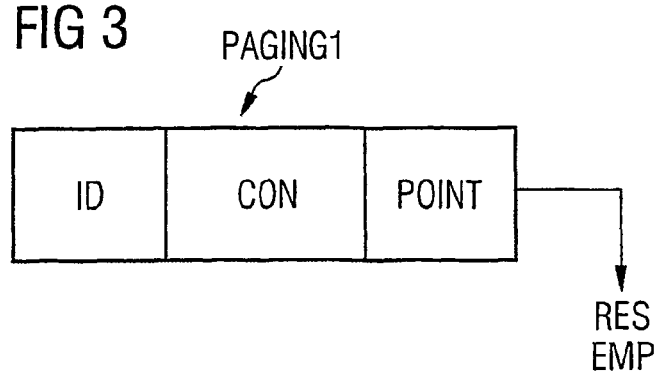

METHOD AND APPARATUS FOR MULTI-CASTING USEFUL INFORMATION IN A RADIO COMMUNICATION SYSTEM

CROSS REFERENCE TO RELATED APPLICATIONS

This application is based on and hereby claims priority to European Application No. 03250668 filed on Feb. 3, 2003, the contents of which are hereby incorporated by reference.

BACKGROUND OF THE INVENTION

In radio communication systems, information (for example, voice, visual information, video information, SMS [Short Message Service] or other data) is transmitted by using electromagnetic waves via a radio interface between the sending and receiving station such as, for example, radio access devices and subscriber stations. Therefore, the transmission of electromagnetic waves is carried out with carrier frequencies, which lie in the frequency band provided for the specific system.

Usually, at least one radio access device and one device for radio access control (BSC, Base Station Controller) form part of a base station subsystem (RNS, Radio Network Subsystem or BSS, Base Station Subsystem). A radio communication system usually includes a plurality of base station subsystems, which are connected to a core network (CN, Core Network). In this case, the device for the radio access control of the base station subsystem is connected to an access device of the core network.

For the established GSM mobile radio system (Global System for Mobile Communication), frequencies of 900, 1800 and 1900 MHz are used. These systems essentially transmit voice, telefax and short messages as well as digital data.

Frequencies are provided in the frequency band of approximately 2000 MHz for future mobile radio systems with CDMA or TD/CDMA transmission methods such as, for example, UMTS (Universal Mobile Telecommunication System) or other systems of the third generation. These systems of the third generation are developed with a view to obtaining world-wide radio coverage, an extensive range of services for the transmission of data and especially a flexible management of the capacity of the radio interface, which in the case of radio communication systems is the interface with the least resources.

In the case of radio communication systems, subscriber stations accessing the common transmission medium are regulated by the multiple access methods/multiplex methods (Multiple Access, MA). In the case of these multiple accesses, the transmission medium can be divided between the subscriber stations in the time area (Time Division Multiple Access, TDMA), in the frequency area (Frequency Division Multiple Access, FDMA), in the code area (Code Division Multiple Access, CDMA) or in the space area (Space Division Multiple Access, SDMA). A combination of several such methods can also be used. In order to make it possible to deal cost-effectively with the scarce radio resources, devices that manage the radio resources or carry out a resource allocation are located in radio communication systems. In this case, the radio resource of a radio interface can for example be a time slot of a frequency pair or even only one of the two (time slot or frequency).

Different methods are known for addressing subscriber stations in radio communication systems. Besides unicasting in which precisely one subscriber station is addressed, broadcasting in which all the subscriber stations within the radio coverage area of the sending radio access device are addressed seems to be most commonly used. In addition, multicasting is known in which the subscriber stations of a multicast group are addressed at the same time as the transmission of multicast information. A multicast, in which the addressed group includes all the subscriber stations within the range of a radio access device, corresponds to a broadcast. For multicast services, it is required that the addressed subscriber stations belong to a limited group, while this is not the case for broadcast services.

As a result, besides individual useful information, useful information is also transmitted in radio communication systems, which is made available to a plurality of subscriber stations. Such useful information includes for example video streams, advertising texts, or general information such as traffic reports. The services for transmitting useful information, which are not only provided individually to a single subscriber, but are made available to a plurality of subscribers are covered by the term MBMS (Multimedia Broadcast/Multicast Service). The core network usually makes available the different MBMS services as separate data flows.

Before the useful information of one group of subscriber stations is transmitted, the subscriber stations are notified as to how many subscribers would like to use the service. This notification of the subscriber stations is necessary to make possible the configuration of the receivers. For the notification, group-specific mechanisms are usually used in which a plurality of subscriber stations is addressed at the same time.

SUMMARY OF THE INVENTION

It is an object of the invention to create a method and a network device of the type mentioned at the beginning which allow the scarce radio resources of a radio communication system to be handled efficiently.

The radio communication system includes a plurality of subscriber stations. Useful information of one group of subscriber stations is transmitted by radio. A portion of the subscriber stations in the group is located in the radio coverage area of at least one radio access device. At least one radio access device notifies the subscriber stations about the portion of subscriber stations of the group before the useful information is transmitted. According to the invention, the notification includes information relating to at least one signal relating to the transmission of the useful information transmitted via another radio resource. This means that the notification contains information relating to at least one signal transmitted via another radio resource. Furthermore, this also relates to at least one signal for the transmission of the useful information transmitted via another radio resource.

In this case, the group at least includes one subscriber station, but preferably a plurality of subscriber stations. The number of subscriber stations within the radio coverage area of the at least one radio access device can be zero or a whole number greater than zero, however, the maximum is the number of subscriber stations in the group.

The notification contains information relating to at least one signal. In this case, the notifications containing information about the signal may refer to the signal in different ways, i.e. directly or indirectly. Thus the notification containing the information may for example relate to the circumstances in which the signal is transmitted or other processes which influence the transmission of the signal.

In an embodiment of the invention, the information includes instructions about the transmission and/or relates to the content of at least one signal. The instructions about the transmission may concern, in particular, the specification of the other radio resources, for example according to the frequency and/or the time slot and/or the code and/or the transmission direction. The instructions about the signal content may relate directly or indirectly to the signal, for example, it may include an abstract of the content or there may be differences between the content and another specific signal content.

Advantageously, the information relating to at least one signal includes an instruction to the subscriber stations as the receiver of at least this one signal which should evaluate at least this one signal. Therefore, the information in the notification represents a request to the subscriber stations, which is characterized by the instruction that at least one signal, has to be received and evaluated. It usually remains the decision of the subscriber station whether or not the signal should be evaluated.

In a further development of the invention, at least one signal includes instructions about the radio resource such as, for example, an instruction about the transmission channel used for the transmission of the useful information. It is also possible that other instructions about the transmission of useful information are included in at least one signal such as, for example, the frequency of the transmission of useful information or quality information or group-specific information about the subscriber stations of the group.

In a preferred embodiment of the invention, the notification includes a request to the subscriber stations about the number of subscriber stations, to send an answer signal each time, subject to a condition. Such a request, depending on the nature of the condition, may result in the fact that the radio network needs to know the total number of subscriber stations or a portion of this total number within the radio coverage area of a radio access device. If the condition is met, an answer signal has to be sent. In this case, the condition can be applicable or inapplicable to all the subscriber stations of the group or also only to some of the subscriber stations of the group. In this case, the nature of the condition can depend on different factors such as, for example, the geographical position of the radio access device, the actual utilization of the radio resources of the radio access device, answer signals to previous notifications, etc. The type of condition can for example be selected in such a way that an attempt is made to obtain an intended number of answer signals. Advantageously, the condition can include at least one time span and/or identification information about the subscriber stations. The indication of a time span in the notification in combination with the naming of an event from when this time span should be calculated is suitable. The using of identification information about subscriber stations allows a selection of subscriber stations which should answer the notification.

In an embodiment of the invention, the notification includes the identification information relating to the useful information such as, for example, the identification of the multicast service or the broadcast service.

The method described below for transmitting information in a radio communication system can be used as an alternative or in addition to the method according to the invention.

In this case, the radio communication system includes a plurality of subscriber stations. Useful information of one group of subscriber stations is transmitted by radio. A portion of the subscriber stations in the group is located in the radio coverage area of at least one radio access device. At least this one radio access device notifies the subscriber stations of the number of subscriber stations in the group before useful information is transmitted.

For the transmission of useful information by at least one radio access device, a radio resource can be used depending on the reception of at least one answer signal to the notification of the subscriber stations about the number of subscriber stations within range of at least one radio access device and/or on the content of at least one answer signal to the notification of the subscriber stations about the number of subscriber stations.

In the case of the radio resource used for the transmission of useful information, whose type or characteristics depend on at least one answer signal may concern, in particular, the different types of radio channels. The radio resource can for example be characterized by an indication of the frequency, the time, the code, a direction of the transmission or a combination of these.

The answer signals may have a different content. In this way, the content of the answer signals can include, for example, identification information from which it is clear that the relevant signal is an answer signal to the notification. In addition, the radio network, by using a suitable radio channel for the answer signals could recognize, based on the radio channel that the signal is an answer signal.

In this case, relevant for the dependence of the radio resource is the receipt and/or the content of at least one answer signal. The values receipt and content can at least partially refer to different answer signals, but also to the same answer signals. Referring to the receipt of an answer signal, the fact "received" or "not received" is of interest. In the case of a plurality of answer signals, the number of received answer signals can also be relevant for the dependence of the radio resource.

In an embodiment of the invention, on the reception of no answer signal to the notification of the subscriber stations about the number of subscriber stations within range of at least one radio access device, the useful information is not transmitted by at least one radio access device. According to the invention, the procedure in which the useful information cannot be transmitted can be used in one or a plurality of radio cells, while at the same time the useful information is transmitted to the radio resources in one or several other radio cells. In addition, it is possible according to the invention that in a radio cell, the procedure in which the useful information cannot be transmitted, may alternate in time with the transmission of useful information to the radio resources.

Advantageously, either a subscriber-specific or a group-specific radio resource is used for the transmission of useful information by at least one radio access device. In the case of a subscriber-specific radio resource, a dedicated radio channel is for example used; the radio channel specially reserved for a subscriber station and which only evaluates the addressed subscriber station (unicast), while a broadcast channel or a multicast channel is an example of a group-specific radio resource. In the case of such an above-mentioned radio resource, an individual subscriber station is not addressed, but all the subscriber stations within the radio coverage area of the relevant radio access point or all the subscriber stations of a multicast group are addressees of the useful information. In the case of a dedicated radio channel, a point-to-point connection is involved, while a group-specific radio resource is used in the case of a point-to-multipoint connection.

In a further development of the invention, the transmission of useful information by at least one radio access device uses a radio resource depending on a number of answer signals received in at least one radio access device to the notification of the subscriber stations about the number of subscriber stations. In this way it is, for example, possible to use from the reception of a number of answer signals to be determined, which can correspond with a threshold value, a specific type of radio channel for the transmission of useful information. Undershooting the threshold value or exceeding the threshold value is then decisive for the radio resource used for the transmission of useful information.

According to the invention, the network device generates a notification containing information relating to at least one signal relating to the transmission of the useful information transmitted via another radio resource.

According to the invention, it must not be possible to separate the physical structure of the network device from the radio access device. In this way, it is possible that there is a device in the radio communication system, which has the functionality of a radio access device in the form of transmitting and receiving devices in connection with suitable control units as well as the features of the invention. The network device is particularly suitable for carrying out the method according to the invention. Further means and devices for carrying out the method can be provided in the network device.

BRIEF DESCRIPTION OF THE DRAWINGS

These and other objects and advantages of the present invention will become more apparent and more readily appreciated from the following description of the preferred embodiments, taken in conjunction with the accompanying drawings of which:

FIG. 1 is a block diagram of a section from a radio communication system,

FIG. 2 is a flowchart of a method according to the invention,

FIG. 3 is a diagram of the structure of a notification according to the invention.

DETAILED DESCRIPTION OF THE PREFERRED EMBODIMENT

Reference will now be made in detail to the preferred embodiments of the present invention, examples of which are illustrated in the accompanying drawings, wherein like reference numerals refer to like elements throughout.

FIG. 1 shows a section from a radio communication system according to the standard GSM which includes a radio access device BS in the form of a base station, a plurality of subscriber stations MS1, MS2, MSG1, MSG2, MSG3, MSG4 and MSG5, as well as a network device E and additional network devices NET. The device E is connected to both the radio access device BS and the additional network devices NET. The additional network devices NET can have one or a plurality of connections to other radio communication systems.

The device E can be implemented for example by a device for radio access control (BSC, Base Station Controller). Its physical structure can also be connected to the radio access device BS and thus represent a multifunctional device.

A circle indicates the boundary of the radio coverage area F of the radio access device BS. The subscriber stations MS1, MSG1, MSG2 and MSG3 lie within this radio coverage area F. The other subscriber stations MS2, MSG4 and MSG5 lie outside the radio coverage area F of the radio access device BS. They can lie within a radio coverage area of one or more other radio access devices of the radio communication systems—not shown for reasons of simplification of the diagram in FIG. 1—or also outside the radio coverage areas of the radio access devices of the radio communication system.

The subscribers of the relevant subscriber stations MSG1, MSG2, MSG3, MSG4 and MSG5 have subscribed to a multicast service. In this way, the subscriber stations MSG1, MSG2, MSG3, MSG4 and MSG5 form a group. Useful information such as, for example, stock exchange information or videos are sent in the radio communication system which can be received and decrypted by the group of the subscriber stations MSG1, MSG2, MSG3, MSG4 and MSG5. Subscriber stations besides the subscriber stations MSG1, MSG2, MSG3, MSG4 and MSG5 of the group, i.e. the subscriber stations MS1 and MS2 cannot decrypt this multicast information. The multicast information is transmitted by the radio access device BS for the subscriber stations MSG1, MSG2 and MSG3 within its radio coverage area F. The other subscriber stations MSG4 and MSG5 outside the radio coverage area F of the radio access device BS can receive the multicast information from another radio access device of the radio communication system. If a radio connection between these subscriber stations MSG4 and MSG5 and the radio network of the radio communication system is temporarily not possible, the subscriber stations MSG4 and MSG5 do not receive the multicast information during this time span.

For reasons of simplification, the following embodiments only refer to the subscriber stations MSG1, MSG2 and MSG3 within the radio coverage area F of the radio access device BS.

If a plurality of subscriber stations of a multicast group lie within a radio cell, then the useful information of the multicast service—i.e. the multicast information—can be transmitted by using the point-to-multipoint method. In this case, a point-to-multipoint transmission is carried out on a common radio resource for a plurality of subscribers, i.e. a group-specific radio resource that is designed more or less in the same way as a broadcast channel (BCH, Broadcast Channel). Another possibility for the transmission of multicast information is to send this useful information to each subscriber of the multicast group on a subscriber-specific radio resource, which is assigned completely to the service, i.e. a dedicated channel.

The transmit power, which is used when transmitting the multicast information on a point-to-multipoint channel, is usually considerably higher than the transmit power used when transmitting this information on a point-to-point channel. In particular, the transmit power of the multicast information on a point-to-multipoint channel is not subjected to a power regulation, which contrary to this is given when transmitting this information on a point-to-point channel. If a plurality of subscriber stations is located in a radio cell, then it is advantageous to transmit the multicast information on a point-to-multipoint channel. This procedure brings about a saving in the scarce radio resources in the downlink, DL. However, if only a few subscriber stations are located in a radio cell, the transmission of the multicast information on a point-to-multipoint channel based on the high transmit power of this radio channel can be unfavorable compared with a point-to-point channel. The high transmit power of the common channel brings about undesired interferences in the radio cell. Sending the multicast information on one more point-to-point channels would allow radio resources to be saved and transmission quality to be improved in this case.

In order to be able to configure the subscriber stations MSG1, MSG2 and MSG3 of the multicast group of the example studied, it is necessary to notify these stations before the useful information is transmitted. This notification can be carried out group-specifically on a commonly-used channel such as, for example, a paging channel. In this case, the subscriber stations MSG1, MSG2 and MSG3 in particular can be in an idle mode. Below, it is assumed that the subscriber stations MSG1, MSG2 and MSG3 are in such an idle mode. However, according to the invention, the method can also be used on subscriber stations in operating modes other than the idle mode. The idle mode is characterized by the fact that the subscriber stations in the idle mode are indeed known in the core network by identification information, but this is not the case in the radio access network, RAN of a radio communication system. In this way, it remains unknown to a device for radio access control, which subscriber stations in the idle mode are located in the radio cells of the radio access devices connected to them. A subscriber station in the idle mode does not exchange information with the radio network until a connection request is made by the subscriber station or the radio network. After such a connection request, the subscriber station changes over to the connection mode. A connection request can be initiated for example by a request from the subscriber station for a service or also by a paging request of the radio network.

FIG. 2 shows, by way of example, the execution sequence of a method according to the invention. The left part of FIG. 2 shows the signals that are exchanged between the radio access device BS and the subscriber stations of the group G. The right side includes an indication of the radio resource used for the transmission of the relevant signals.

The radio access device sends a notification PAGING 1 via the imminent transmission of multicast information on a paging channel PCH to the subscriber stations of group G. The radio access device does not know how many subscriber stations are located within its radio coverage area. If all the subscriber stations MSG1, MSG2 and MSG3 of the group G, which are located within the radio coverage area of the radio access device BS after the reception of the notification PAGING1, send an answer signal, the radio access device BS knows the number of subscriber stations of the group G within its radio coverage area.

According to the invention, FIG. 3 shows the structure of a notification PAGING1 that includes a first field with identification information ID, which concerns the multicast information. In this case, it can for example be a number, which has been allocated to the multicast service. The subscriber stations, which tap the paging channel PCH and in this way receive the notification PAGING1, can recognize from the information ID whether or not the notification PAGING1 is relevant for them. An answer signal should and may only be sent by those subscriber stations which, based on the information ID, recognize that they are the addressee of the notification PAGING1, i.e. a member of the multicast group.

The notification PAGING1 has an additional field, which includes the information POINT. This information POINT, on the one hand, forms a pointer for sending information via the multicast service on another radio resource RES than on the paging channel PCH. This information about the multicast service transmitted on another radio resource RES is repeated in particular e.g. transmitted at regular time intervals. In the case of another radio resource RES, it can for example be an AGCH (Access Grant Channel) or an FACH (Forward Allocation Channel). Another radio resource RES can distinguish itself from the radio resource for the notification PAGING1 for example by the frequency and/or the time and/or the code and/or the transmission direction. The pointer function of the information POINT is implemented by another radio resource RES being specified for the subscriber stations by the information POINT so that they are in a position to evaluate the information via the multicast service of another radio resource.

Information about the multicast service can include for example information about the radio resources of a point-to-multipoint channel used for the transmission of the multicast information. Information about the multicast service makes it possible for the subscriber stations—possibly also in combination with the notifications, to receive and evaluate the multicast information. Therefore, each subscriber station should have received the information about the multicast service before the multicast information is received. For an additional sending of the multicast information, a repeated evaluation of the information about the multicast service is not required. As a result, the pointer function for the information about the multicast service is of particular interest for subscriber stations, which are added as new users to the multicast service in the radio cell. These are for example subscriber stations, which were previously disconnected or which have been replaced with another radio cell in the relevant radio cell.

On the other hand, the information POINT can also relate to the content of the signal on another radio resource RES. It is thus possible that the information POINT indicates that or when this information has changed in a repeated transmission of information via the multicast service, for example in the form of an update. Changing the information via the multicast service in time is also relevant for those subscriber stations, which have not been added as new users to the multicast service in the radio cell. Before the reception of the next multicast information, these should also again take into consideration the information about the multicast service.

Finally, the information POINT can also relate to the information transmitted via the multicast service to another radio resource RES provided that it is specified which subscriber stations EMP should evaluate this information via the multicast service. In this way, the information POINT can include a dividing of subscriber stations into subgroups to which, in each case, a request for observing the information via the multicast service is issued or not issued. Advantageously, it can be specified in this way that the subscriber stations, which have not received the multicast information sent last, should receive and evaluate the information via the multicast service. On the other hand, when updating this information, the information POINT should indicate that all the subscriber stations of the multicast group, evaluate the information via the multicast service.

Using the information POINT, in particular brings about a saving in the resources on the paging channel PCH, if the information of another radio resource is a detailed description of the multicast service. In this way, a transmission of information via the multicast service, which is expensive in terms of resources, can be avoided for each paging message.

In addition, the notification PAGING1 includes a request, to send an answer signal, subject to a condition CON. If the condition applies then this indicates to the receiving subscriber station whether or not an answer signal should be sent to the notification PAGING1. In this way, the condition CON can for example read that an answer signal has to be sent if a symbol with the meaning "yes" can be found in a field. Using a "no" or refraining from saying "yes" at this point can for example be helpful in this case if it can be assumed that, a plurality of subscriber stations is actually located in the relevant radio cell such as, for example, in a full soccer stadium. As a result, a saving in the radio resources can be obtained in the uplink, UL.

Another condition can refer to the identification information of the subscriber station. For example, all the subscriber stations with an odd number of the identification information could be requested to send an answer signal.

It is particularly advantageous if the condition CON includes a time span, from which the subscriber stations could gather whether or not an answer signal must be sent. In this case, the time span for example can refer to the time span, which has expired since a subscriber station has received the last notification about an imminent multicast transmission. In this case, these subscriber stations, which have received the last notification in general or in a specific radio cell, before a time span, which is greater than the time span specified in the condition CON, can be requested to send an answer signal. Therefore, subscriber stations which were recently connected or had entered the relevant cell can preferably be recorded in the cell. In addition, the time span can refer to the time span after the reception of the notification PAGING1. This can for example mean that an answer signal may not be sent later than a specific period in time, namely after the expiry of the time span after the reception of the notification PAGING1.

The condition CON can also be linked with the information POINT such as, for example, subject to a condition that those subscriber stations, which have not yet tapped the information via the multicast service on another radio resource RES, to send an answer signal or by using a condition to request the subscriber stations EMP to send an answer signal.

Using a condition CON brings about a saving in the resources in the uplink, because it may also be possible that not all the subscriber stations of the group, which were addressed by the notification PAGING1, send an answer signal. In addition, the probability of answer signals colliding can be reduced under the circumstances if a number of answer signals lower than the maximum number of possible answer signals is sent.

In addition to the described fields, the notification PAGING1 can have additional fields depending on the situation. If required, one or a plurality of notifications can also be abandoned on one or a plurality of the described fields.

The described notification PAGING1 is generated in the network device by using the unit M (FIG. 1). This forwards the notification PAGING1 to the radio access device BS, which transmits it to the subscriber stations.

FIG. 2 shows the case in which two subscriber stations of the group G send an answer signal ANSWER1 and ANSWER2 to the notification PAGING1. A condition CON could for example in this case have read that an answer may only take place within a specific time span after the reception of the notifications. This sending of the answer signals ANSWER1 and ANSWER2 takes place on a radio channel RACH, which is also used to access randomly the radio resources of the radio cell. However, a radio channel specially set up for the answer signals can also be used. In order to be able to establish an allocation between the answer signals ANSWER1 and ANSWER2 and the notification PAGING1 on the side of the network, the answer signals ANSWER1 and ANSWER2 are provided with a corresponding identification such as, for example, with the identification information ID of the notification PAGING1.

The radio access device BS forwards the answer signals ANSWER1 and ANSWER2 to the network device E of FIG. 1. The device E counts the received answer signals ANSWER1 and ANSWER2. The result of the count is then compared with a threshold value, which should be three as specified below. The value of the threshold value can be constant or changed in time and, therefore, an adaptation of the threshold value to the actual traffic utilization of the radio cell is for example possible in this way. The type of the radio resource, which should be used for the pending transmission of multicast information, depends on the result of the comparison. In this example, a decision is made that based on the fact that the number of answer signals ANSWER1 and ANSWER2 received in the radio access device BS lie below the threshold value, the multicast information is sent on point-to-point channels. The described decision process is summarized in FIG. 2 in the block labeled DECIDE.

The decision about the type of radio resource, which should be used for the pending transmission of the multicast information, can in addition to or as an alternative to the received answer signals ANSWER1 and ANSWER2 also depend on other criteria. In this way, the answer signals can, for example, include information about the subscriber stations, which should use radio resources for the transmission of multicast information.

If a subscriber station of the group G does not answer the notification PAGING1, the device E can make the decision not to send the multicast information in the relevant radio cell by the radio access device BS. As a result, a saving in the radio resources can be obtained in the uplink.

If the decision has been made to transmit multicast information via point-to-point channels to the subscriber stations of the group G, the device E notifies the radio access device BS, whereupon the device transmits the multicast information MULTI_INFO1, via point-to-point channels PTP, to the two subscriber stations which have sent the answer signals ANSWER1 and ANSWER2.

Before sending the next multicast information, the radio access device BS again sends a notification PAGING2 on the paging channel PCH. In principle, the structure of this notification PAGING2 corresponds with the structure which has already been described for the notification PAGING1, however it can differ from the notification PAGING1 in view of its concrete embodiment. The notification PAGING2 includes as a condition CON for sending an answer signal, a field with the content "yes". As a result, on the notification PAGING2, three subscriber stations of the group G send answer signals ANSWER1, ANSWER2 and ANSWER3 on the radio channel for random accesses RACH. The number of these answer signals ANSWER1, ANSWER2 and ANSWER3 is compared in a decision process DECIDE with the threshold value. Because the number of the answer signals ANSWER1, ANSWER2 and ANSWER3 does not fall short of the threshold value, a decision is now made to send the multicast information on a point-to-multipoint channel. Therefore, the sending of the next multicast information MULTI_INFO2 to the subscriber stations of the group takes place on the point-to-multipoint channel PTM.

By adapting the type of transmission channel to the received answer signals, the method described allows multicast information which is not expensive in terms of the resources to be transmitted.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide* v. *DIRECTV*, 69 USPQ2d 1865 (Fed. Cir. 2004).

The invention claimed is:

1. A method of transmitting information in a radio communication system having subscriber stations, comprising:
  transmitting useful information to a group of subscriber stations, where a portion of the subscriber stations in the group are located within a radio coverage area of a radio access device;
  sending, via a radio resource from the radio access device to the portion of the subscriber stations before the useful information is transmitted, a notification including information relating to at least one information signal;
  transmitting said at least one information signal via another radio resource, wherein said at least one information signal is separate from the notification and is related to, but does not provide the useful information; and evaluating by the subscriber stations whether to receive the useful information based on the notification and the at least one information signal.

2. A method according to claim 1, wherein the information in the notification includes at least one of content information relating to content of the at least one information signal, and instructions about transmission of the at least one information signal.

3. A method according to claim 1, wherein the information in the notification includes receiver information about a subscriber station being a receiver of the at least one information signal and having to evaluate the at least one information signal.

4. A method according to claim 1, wherein the at least one information signal includes resource information about the other radio resource used for transmission of the useful information.

5. A method according to claim 1, wherein the notification includes a request to the portion of the subscriber stations to send an answer signal subject to a condition.

6. A method according to claim 5, wherein the condition includes at least one time span and/or identification information of identified subscriber stations.

7. A method according to claim 1, wherein the notification includes identification information of the useful information.

8. A method according to claim 1, wherein the other radio resource used in transmitting the useful information by the radio access device depends on at least one of reception by the radio access device of at least one answer signal to the notification and the content of at least one answer signal to the notification.

9. A method according to claim 8, wherein if no answer signal to the notification is received by the radio access device, the useful information is not transmitted by the radio access device.

10. A method according to claim 8, wherein the other radio resource used for transmission of the useful information by the radio access device is either subscriber-specific or group-specific.

11. A method according to claim 8, wherein the other radio resource used for transmission of the useful information by the radio access device depends on a number of answer signals received by the radio access device to the notification.

12. A method of transmitting information in a radio communication system having subscriber stations, comprising:

transmitting useful information via a first radio resource to a group of subscriber stations, where a portion of the subscriber stations in the group are located within a radio coverage area of a radio access device;

sending, via a second radio resource from the radio access device to the portion of the subscriber stations before the useful information is transmitted, a notification including information relating to at least one information signal;

transmitting said at least one information signal via another radio resource, wherein said at least one information signal is separate from the notification and is related to, but is not included in the transmission of the useful information; and evaluating by the subscriber stations whether to receive the useful information based on the notification and the at least one information signal, whereby said first radio resource used for transmission of the useful information by the radio access device is depending on at least one of reception by the radio access device of at least one answer signal to the notification and the content of at least one answer signal to the notification.

13. A method according to claim 12, wherein if no answer signal to the notification is received by the radio access device, the useful information is not transmitted by the radio access device.

14. A method according to claim 12, wherein the first radio resource used for transmission of the useful information by the radio access device is either subscriber-specific or group-specific.

15. A method according to claim 12, wherein the first radio resource used for transmission of the useful information by the radio access device depends on a number of answer signals received by the radio access device to the notification.

16. A network device in a radio communication system in which useful information is transmitted by radio to a group of subscriber stations, said network device comprising:

a unit generating a notification to be transmitted via a first radio resource to the subscriber stations of the group before transmission of the useful information, the notification including information relating to at least one information signal, separate from the notification, relating to, but not providing the transmission of the useful information;

whereby said at least one information signal is transmitted via a second radio resource to the subscriber stations enabling evaluation of the notification and the at least one information signal to determine whether to receive the useful information.

\* \* \* \* \*